June 2, 1970 R. H. COLLEY 3,514,954
GAS TURBINE BY-PASS ENGINE
Filed June 3, 1968
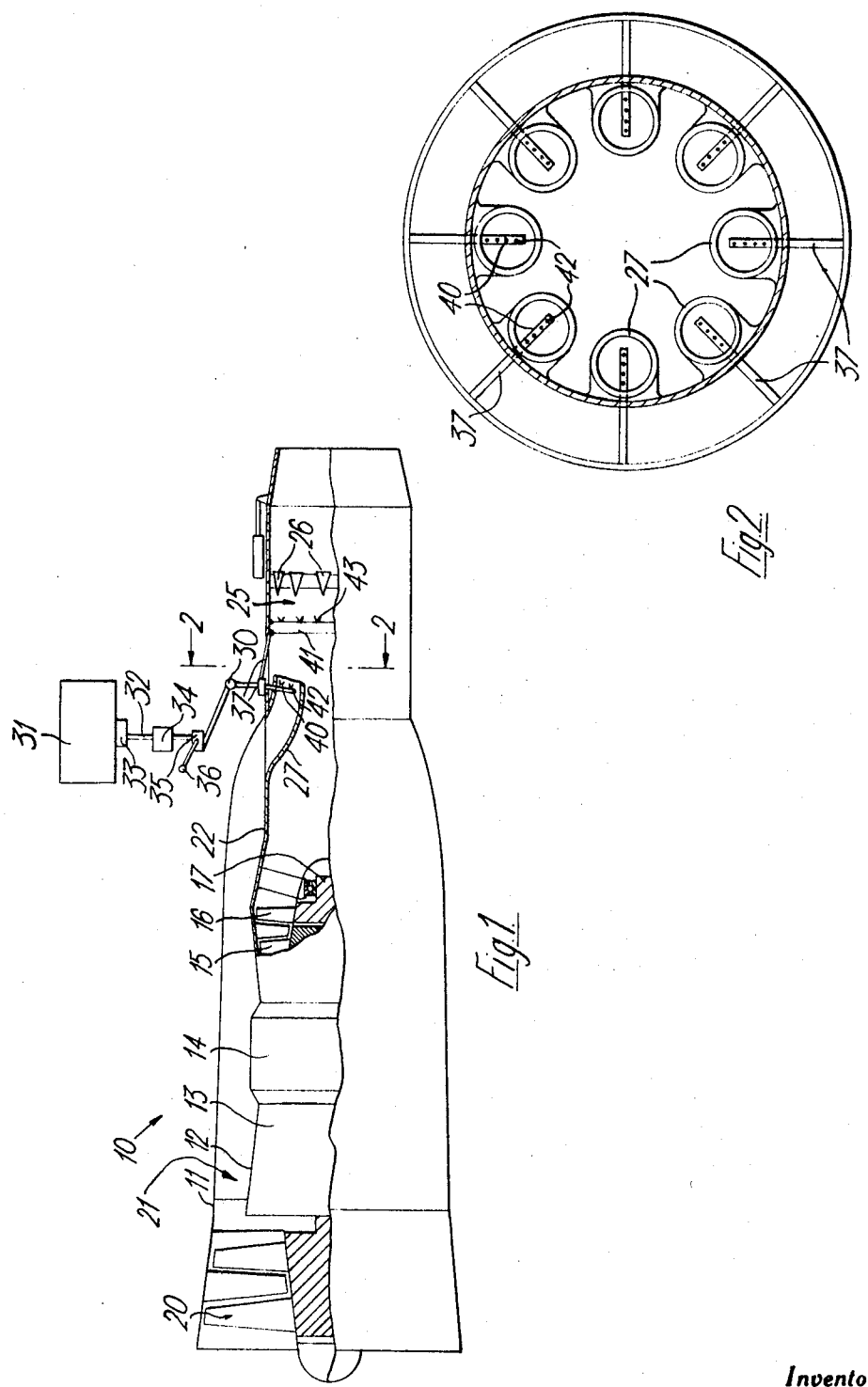
Inventor
ROWAN HERBERT COLLEY
By
Cushman, Darby & Cushman
Attorneys

United States Patent Office 3,514,954
Patented June 2, 1970

3,514,954
GAS TURBINE BY-PASS ENGINE
Rowan Herbert Colley, Sunny Hill, Derby, England, assignor to Rolls-Royce Limited, Derby, England, a British company
Filed June 3, 1968, Ser. No. 734,055
Claims priority, application Great Britain, June 16, 1967, 27,961/67
Int. Cl. F02k 3/10
U.S. Cl. 60—261    4 Claims

ABSTRACT OF THE DISCLOSURE

A gas turbine by-pass engine has in flow series compressors, main combustion equipment, turbines and a jet pipe which receives the turbine exhaust gases. The jet pipe has reheat combustion equipment mounted in it, and there is also provided by-pass ducting which is arranged to by-pass the main combustion equipment and the turbines, the by-pass ducting communicating with the jet pipe upstream of the reheat combustion equipment. The upstream portion of the by-pass ducting is supplied with compressed air, and one set of fuel injectors mounted in the by-pass ducting to inject reheat fuel into the compressed air flowing through the by-pass ducting towards the reheat combustion equipment. A second set of fuel injectors are mounted in the jet pipe for injecting reheat fuel into the turbine exhaust gases flowing through the jet pipe towards the reheat combustion equipment.

---

This invention concerns a gas turbine by-pass engine.

According to the present invention, there is provided a gas turbine by-pass engine having in flow series compressor means, main combustion equipment, and turbine means, a jet pipe which receives the turbine exhaust gases and which has reheat combustion equipment mounted therein, by-pass ducting which is arranged to by-pass the main combustion equipment and turbine means and which communicates with the jet pipe upstream of the reheat combustion equipment, means for supplying an upstream portion of the by-pass ducting with compressed air, first fuel injectors mounted in the by-pass ducting for injecting reheat fuel into the compressed air flowing through the by-pass ducting towards the reheat combustion equipment, and second fuel injectors mounted in the jet pipe for injecting reheat fuel into the turbine exhaust gases flowing through the jet pipe towards the reheat combustion equipment, the by-pass ducting comprising a duct, a portion of which annularly surrounds the jet pipe, and a plurality of angularly spaced apart mixer chutes whose upstream and downstream ends respectively communicate with the said duct and with the said jet pipe, the first fuel injectors being mounted in the mixer chutes.

In the engine of the present invention, reheat fuel is injected both into the by-pass air and into the turbine exhaust gases with the result that there will be, upstream of the reheat combustion equipment, less variation in the mass flow through the jet pipe than would otherwise be the case, and therefore reheat combustion will be more uniform.

Preferably, the compressed air flowing through the mixer chutes carries the fuel from the first fuel injectors towards the engine axis. Moreover, the first fuel injectors may be mounted in the mixer chutes to direct fuel towards the engine axis.

The second fuel injectors are preferably mounted downstream of the first fuel injectors.

The first and second fuel injectors may be connected to a common source of reheat fuel.

The engine may have a front fan which supplies air to the by-pass ducting.

The invention is illustrated, merely by way of example, in the accompanying diagrammatic drawings, in which:

FIG. 1 is a view, partly in section, of a gas turbine by-pass engine in accordance with the present invention, and FIG. 2 is a section taken on the line 2—2 of FIG. 1.

In FIG. 1 there is shown a gas turbine by-pass engine 10 having an outer casing 11 and an inner casing 12. Mounted in flow series within the inner casing 12 is a compressor 13, main combustion equipment 14, and turbines 15, 16. The turbine 15 drives the compressor 13 by way of a shaft (not shown) within which there is mounted a shaft 17 which carries the turbine 16. The shaft 17 also carries a two stage front fan 20, the compressed air produced by which passes to the upstream end of a by-pass duct 21 which is disposed between the outer casing 11 and the inner casing 12.

The by-pass duct 21 by-passes the compressor 13, main combustion equipment 14, and turbines 15 and 16, and has a portion which annularly surrounds a jet pipe 22 which receives the turbine exhaust gases from the turbines 15, 16.

Mounted within the jet pipe 22 there is provided reheat combustion equipment 25 which comprises a plurality of concentric, V-section, downstream facing, annular gutters 26.

A plurality of angularly spaced apart mixer chutes 27 has upstream and downstream ends which respectively communicate with the by-pass duct 21 and with the jet pipe 22 upstream of the reheat combustion equipment 25.

Mounted on the jet pipe 22 is an annular fuel manifold 30 which is supplied with reheat fuel from a tank 31. The reheat fuel passes from the tank 31 to the manifold 30 by way of a conduit 32 in which there is arranged a backing pump 33, a fuel control system 34, and a throttle valve 35 which is operable by a pilot's lever 36.

Extending radially inwardly from the manifold 30 are a plurality of pipes 37, each of which communicates with pipes 40, 41. The pipes 40, which are provided with apertures forming fuel injectors 42, are mounted in the mixer chutes 27 so as to direct reheat fuel towards, and at a small angle to, the engine axis. The compressed air which flows through the mixer chutes 27 carries this fuel towards the engine axis and towards the reheat combustion equipment 25.

Each of the pipes 41 is provided with fuel injectors 43 which are mounted downstream of the fuel injectors 42 and are mounted within the jet pipe 22. The fuel injectors 43 are arranged to inject reheat fuel into the turbine exhaust gases which flow through the jet pipe 22 towards the reheat combustion equipment 25. Thus both the fuel injectors 42, 43 are connected to a common source of reheat fuel.

As will be appreciated, the arrangement shown in the drawings may be arranged to inject relatively more fuel into the cold by-pass air entering the jet pipe 22 through the mixer chutes 27 than into the turbine exhaust gases flowing through the jet pipe 22. This by-pass air will, however, be richer in oxygen than the turbine exhaust gases and the arrangement shown in the drawings will therefore assist in reducing the disparity between the fuel/oxygen ratios of the by-pass air and turbine exhaust gases, and thereby improve reheat combustion.

I claim:

1. A gas turbine by pass engine having in flow series, compressor means, main combustion equipment, and turbine means, a jet pipe which receives the turbine exhaust gases, reheat combustion equipment mounted in the jet pipe, by-pass ducting which is arranged to by-pass the main combustion equipment and turbine means, and a duct portion of which annularly surrounds the jet pipe and which communicates therewith upstream of the reheat combustion equipment, means for supplying an upstream portion of the by-pass ducting with compressed air, a plurality of angularly spaced apart mixer chutes whose upstream and downstream ends respectively communicate with the said duct portion of the by-pass ducting and with the said jet pipe for directing compressed air from the by-pass ducting towards the reheat combustion equipment, first fuel injectors mounted within and adjacent to the downstream end of the mixer chutes for injecting reheat fuel into the compressed air flowing therethrough, and second fuel injectors mounted in the jet pipe downstream of the first fuel injectors for injecting reheat fuel into the turbine exhaust gases flowing through the jet pipe towards the reheat combustion equipment.

2. An engine as claimed in claim 1 in which the compressed air flowing through the mixer chutes carries the fuel from the first fuel injectors towards the engine axis.

3. An engine as claimed in claim 1 in which the first and second fuel injectors are connected to a common source of reheat fuel.

4. An engine as claimed in claim 1 in which the engine has a front fan which supplies compressed air to the by-pass ducting.

References Cited

UNITED STATES PATENTS

| | | | |
|---|---|---|---|
| 2,978,865 | 4/1961 | Pierce | 60—261 |
| 2,979,899 | 4/1961 | Salmon | 60—261 |
| 3,204,404 | 9/1965 | Bauger | 60—262 |
| 3,330,117 | 7/1967 | Coplin | 60—261 |

CARLTON R. CROYLE, Primary Examiner

D. HART, Assistant Examiner

U.S. Cl. X.R.

60—39.74, 262